United States Patent
Yasumiishi et al.

(10) Patent No.: US 10,326,163 B2
(45) Date of Patent: Jun. 18, 2019

(54) CATHODE MATERIAL FOR LITHIUM-ION SECONDARY BATTERY AND LITHIUM-ION SECONDARY BATTERY

(71) Applicant: SUMITOMO OSAKA CEMENT CO., LTD., Tokyo (JP)

(72) Inventors: Hirofumi Yasumiishi, Chiba (JP); Ryuuta Yamaya, Chiba (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 15/715,834

(22) Filed: Sep. 26, 2017

(65) Prior Publication Data

US 2018/0287190 A1  Oct. 4, 2018

(30) Foreign Application Priority Data

Mar. 30, 2017  (JP) ................. 2017-067256

(51) Int. Cl.
*H01M 4/133* (2010.01)
*H01M 4/1393* (2010.01)
*H01M 10/0525* (2010.01)

(52) U.S. Cl.
CPC ....... *H01M 10/0525* (2013.01); *H01M 4/133* (2013.01); *H01M 4/1393* (2013.01)

(58) Field of Classification Search
CPC . H01M 10/0525; H01M 4/133; H01M 4/1393
See application file for complete search history.

(56) References Cited

U.S. PATENT DOCUMENTS

| | | | |
|---|---|---|---|
| 9,017,875 B2* | 4/2015 | Ishii | G11B 5/596 |
| | | | 252/182.1 |
| 9,647,264 B2* | 5/2017 | Mizuno | H01M 4/624 |
| 9,871,246 B2* | 1/2018 | Kim | H01M 4/136 |
| 2018/0241083 A1* | 8/2018 | Takami | H01M 10/0567 |
| 2018/0277887 A1* | 9/2018 | Yasumiishi | C01B 25/45 |
| 2018/0287152 A1* | 10/2018 | Yasumiishi | H01M 4/5805 |

FOREIGN PATENT DOCUMENTS

| | | |
|---|---|---|
| JP | 2012243710 A | 12/2012 |
| JP | 2013025887 A | 2/2013 |

* cited by examiner

*Primary Examiner* — Stewart A Fraser
(74) *Attorney, Agent, or Firm* — Greenblum & Bernstein, P.L.C.

(57) ABSTRACT

A cathode material for a lithium-ion secondary battery which is made of agglomerated secondary particles formed by agglomeration of a plurality of primary particles of electrode active material particles made of a transition metal lithium phosphate compound having an olivine structure that is coated with a carbonaceous material, in which an arithmetic average roughness Ra of agglomerated secondary particle surfaces observed using a three-dimensional scanning electron microscope is 3 nm or more and less than 15 nm.

6 Claims, No Drawings

CATHODE MATERIAL FOR LITHIUM-ION SECONDARY BATTERY AND LITHIUM-ION SECONDARY BATTERY

CROSS-REFERENCE TO RELATED APPLICATIONS

This application claims the benefit of Japanese Patent Application No. 2017-067256 filed Mar. 30, 2017, the disclosure of which is herein incorporated by reference in its entirety.

BACKGROUND OF THE INVENTION

Field of the Invention

The present invention relates to a cathode material for a lithium-ion secondary battery and a lithium-ion secondary battery.

Description of Related Art

Lithium-ion secondary batteries have a higher energy density and a higher power density than lead batteries and nickel-hydrogen batteries and are used in a variety of applications such as small-size electronic devices such as smartphones, domestic backup power supply, and electric tools. In addition, attempts are made to put high-capacity lithium-ion secondary batteries into practical use for recyclable energy storage such as photovoltaic power generation and wind power generation.

Lithium-ion secondary batteries include a cathode, an anode, an electrolytic solution, and a separator. As electrode materials that constitute cathodes, lithium-containing metal oxides having-properties capable of reversibly intercalating and deintercalating lithium ions such as lithium cobalt oxide ($LiCoO_2$), lithium manganese oxide ($LiMn_2O_4$), and lithium iron phosphate ($LiFePO_4$) are used, and studies are made in order for improvement from the viewpoint of an increase in the capacity of batteries, the extension of service lives, improvement of safety, and cost reduction.

Lithium iron phosphate ($LiFePO_4$) as the electrode material contains iron which is an abundant and inexpensive resource and is thus a material the cost of which can be easily reduced. Lithium iron phosphate does not emit oxygen at high temperatures due to the strong covalent bond between phosphorus and oxygen and thus has outstanding safety, which provides lithium iron phosphate with excellent characteristics that oxide-based cathode materials represented by lithium cobalt oxide do not have.

On the other hand, lithium iron phosphate has low Li ion diffusivity and low electron conductivity and thus has worse input and output characteristics than oxide-based cathode materials. This characteristic difference becomes more significant as the operation temperature of batteries becomes lower, and thus lithium iron phosphate has been considered to be inappropriate for in-vehicle applications such as hybrid vehicles for which high input and output characteristics are required at low-temperature regions.

$LiMPO_4$ (M represents a metal element) having an olivine structure which is represented by lithium iron phosphate has low Li ion diffusivity and low electron conductivity, and thus it is possible to improve the charge and discharge characteristics by miniaturizing $LiMPO_4$ primary particles and coating the surfaces of the respective primary particles with a conductive carbonaceous film.

On the other hand, since the miniaturized $LiMPO_4$ has a large specific surface area, an increase in the viscosity of an electrode mixture slurry or a large amount of a binder is required, and thus it is usual to improve the properties of the electrode mixture slurry by turning the primary particles coated with a carbonaceous film into secondary particles by means of granulation.

For example, Japanese Laid-open Patent Publication No. 2013-25887 discloses a cathode for a lithium secondary battery containing a lithium transition metal-based compound having a function capable of intercalating and deintercalating lithium ions, an active material having an angle of repose of 50° or more, and a binding agent. In addition, Japanese Laid-open Patent Publication No. 2012-243710 discloses a cathode for a non-aqueous electrolyte battery in which cathode active material particles produced using a spray-dry method are dispersed in a secondary particle form in a mixture of the cathode active material particles and solid electrolyte particles, and exposed portions of the cathode active material particles that are exposed on the cathode surface are crushed by means of calendering, whereby the cathode surface is flattened.

SUMMARY OF THE INVENTION

The angle of repose of the active material described in Japanese Laid-open Patent Publication No. 2013-25887 is as large as 50° or more, and thus the surface roughness of secondary particles is great, and the joining with conductive materials is strengthened, and thus the service lives of batteries can be extended. However, when the surface roughness of secondary particles is great as in the above-described active material, it is difficult to increase the density during electrode calendering, and there is a problem in that the electron conductivity of electrodes decreases. In addition, in the cathode for a non-aqueous electrolyte battery described in Japanese Laid-open Patent Publication No. 2012-243710, the surface flatness is improved by decreasing the surface roughness of the cathode surface, and the discharge capacity of batteries is also increased by improving the filling ratio of the cathode active material particles, but the discharge capacity is not sufficient.

The present invention has been made in consideration of the above-described circumstances, and an object of the present invention is to provide a cathode material for lithium-ion secondary batteries and a lithium-ion secondary battery which are capable of decreasing direct current resistance.

The present inventors and the like carried out intensive studies in order to achieve the above-described object and found that, when the arithmetic average roughness Ra of agglomerated secondary particle surfaces is set in a specific range, it is possible to achieve the object.

[1] A cathode material for a lithium-ion secondary battery which is made of agglomerated secondary particles formed by agglomeration of a plurality of primary particles of electrode active material particles made of a transition metal lithium phosphate compound having an olivine structure that is coated with a carbonaceous material, in which an arithmetic average roughness Ra of agglomerated secondary particle surfaces observed using a three-dimensional scanning electron microscope is 3 nm or more and less than 15 nm.

[2] The cathode material for a lithium-ion secondary battery according to [1], in which a cumulative micropore volume of the cathode material, measured using a mercury porosimeter in a micropore diameter range of 0.01 to 10 μm, is 0.3 to 0.5 cm³/g.

[3] The cathode material for a lithium-ion secondary battery according to [1] or [2], in which a specific surface area of the cathode material is 8 m²/g or more and 25 m²/g or less, and an oil absorption amount of the cathode material, measured using N-methyl-2-pyrrolidone, is 30 ml/100 g or more and 50 ml/100 g or less.

[4] The cathode material for a lithium-ion secondary battery according to any one of [1] to [3], in which, in a case in which a cathode mixture layer including the cathode material, a conductive auxiliary agent, and a binding agent in a weight ratio of 90:5:5 (the cathode material:the conductive auxiliary agent:the binding agent) is calendered on a 30 μm-thick aluminum current collector at a total applied pressure of 5 t/250 mm, an electrode density of the cathode mixture layer after the calendering is 1.4 g/cm³ or more.

[5] A lithium-ion secondary battery including a cathode, an anode, and an electrolyte, in which the cathode has a cathode mixture layer produced using the cathode material according to any one of [1] to [4], and an electrode density of the cathode mixture layer after the calendering is 1.4 g/cm³ or more.

[6] The lithium-ion secondary battery according to [5], in which the cathode mixture layer includes a cathode material made of agglomerated secondary particles formed by agglomeration of a plurality of primary particles of electrode active material particles represented by General Formula (1) that are coated with a carbonaceous material,

$$Li_xA_yD_zPO_4 \quad (1)$$

(here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

According to the present invention, it is possible to provide a cathode material for a lithium-ion secondary battery and a lithium-ion secondary battery which are capable of decreasing direct current resistance.

DETAILED DESCRIPTION OF THE INVENTION

An embodiment of a cathode material for a lithium-ion secondary battery of the present invention will be described.

Meanwhile, the present embodiment is a specific description for easier understanding of the gist of the present invention and, unless particularly otherwise described, does not limit the present invention.

Cathode Material for Lithium-Ion Secondary Battery

A cathode material for a lithium-ion secondary battery of the present embodiment is a cathode material made of agglomerated secondary particles formed by the agglomeration of a plurality of primary particles of electrode active material particles made of a transition metal lithium phosphate compound having an olivine structure that is coated with a carbonaceous material, in which the arithmetic average roughness Ra of agglomerated secondary particle surfaces observed using a three-dimensional scanning electron microscope is 3 nm or more and less than 15 nm.

The electrode active material particles that are used in the present invention are made of a transition metal lithium phosphate compound having an olivine structure. The transition metal lithium phosphate compound having an olivine structure is preferably electrode active material particles represented by General Formula (1) from the viewpoint of a high discharge capacity and a high energy density.

$$Li_xA_yD_zPO_4 \quad (1)$$

(Here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

Here, A is preferably Co, Mn, Ni, or Fe, and more preferably Fe.

D is preferably Mg, Ca, Sr, Ba, Ti, Zn, or Al. In a case in which the electrode active material particles include these elements, it is possible to produce cathode mixture layers capable of realizing a high discharge potential and favorable safety. In addition, these elements are resources having an abundant amount and are thus preferred as materials to be selected.

The average particle diameter of the primary particles of the electrode active material particles is preferably 30 nm or more and 1,000 nm or less, more preferably 40 nm or more and 600 nm or less, and still more preferably 50 nm or more and 500 nm or less. When the average primary particle diameter of the primary particles is 30 nm or more, an increase in the viscosity of electrode paste is suppressed. In addition, when the average particle diameter of the primary particles is 1,000 nm or less, it is possible to ensure diffusion performance in solid as electrode active material particles and guarantee battery capacities.

Here, the average particle diameter is a number-average particle diameter. The average primary particle diameter of the primary particles can be obtained by randomly selecting 100 primary particles, measuring the long diameters and short diameters of the respective primary particles using a scanning electron microscope (SEM), and obtaining an average value thereof.

The arithmetic average roughness Ra of the agglomerated secondary particle surfaces formed by the agglomeration of a plurality of the primary particles of the electrode active material particles is 3 nm or more and less than 15 nm. In cathode materials for batteries which intend to achieve high input and output characteristics, when the arithmetic average roughness is less than 3 nm, even a minimum necessary amount of the electrolytic solution fails to reach the surface of the cathode, inactive regions are generated in the cathode, and there is a concern that an increase in resistance may be caused, and, when the arithmetic average roughness is 15 nm or more, more solid electrolyte interphase (SEI) films than necessary are generated on the electrode active material particle surfaces, and there is a concern that an increase in resistance or a decrease in the capacity retention of batteries may be caused. From the above-described viewpoint, Ra is preferably 4 to 14.8 nm and more preferably 4.5 to 14.5 nm.

The arithmetic average roughness Ra of the agglomerated secondary particle surfaces can be measured using a three-dimensional scanning electron microscope (3D-SEM) and the method according to JIS B 0601 (2001).

In addition, the average particle diameter of the agglomerated secondary particles formed by the agglomeration of a plurality of the primary particles of the electrode active material particles is preferably 3 μm or more and 20 μm or less and more preferably 5 μm or more and 15 μm or less. When the average particle diameter of the agglomerated secondary particles is 3 μm or more, an increase in the viscosity of electrode paste is suppressed. In addition, when the average particle diameter of the agglomerated secondary particles is 20 µm or less, it is possible to increase the electrode density to a certain extent and guarantee battery capacities.

Meanwhile, in the present embodiment, all agglomerated particles other than the primary particles are considered as agglomerated secondary particles.

Here, the average particle diameter of the agglomerated secondary particles is the volume-average particle diameter. The average particle diameter of the agglomerated secondary particles can be measured using a laser diffraction and scattering particle size distribution measurement instrument or the like. In addition, the average secondary particle diameter may be obtained by randomly selecting 100 agglomerated secondary particles, measuring the long diameters and short diameters of the respective agglomerated secondary particles using a scanning electron microscope (SEM), and obtaining the average value thereof. Meanwhile, in the present invention, the average particle diameter of the agglomerated secondary particles of the electrode active material can be obtained by obtaining the particle diameters of the agglomerated secondary particles of the electrode active material coated with a carbonaceous material (hereinafter, also referred to as "carbonaceous coated electrode active material").

The carbonaceous material is a film intended to impart a desired electron conductivity to the primary particles.

The thickness of the carbonaceous material is preferably 0.5 nm or more and 5.0 nm or less and more preferably 1.0 nm or more and 3.0 nm or less.

When the thickness of the carbonaceous material is 0.5 nm or more, the thickness of the carbonaceous material becomes too thin, and it is possible to form films having a desired resistance value. As a result, the conductivity improves, and it is possible to ensure conductivity suitable for cathode materials. On the other hand, when the thickness of the carbonaceous material is 5.0 nm or less, the degradation of battery activity, for example, the battery capacity of the cathode material per unit mass can be suppressed.

In addition, the coating ratio of the carbonaceous material to the primary particles is preferably 60% or more and more preferably 80% or more. When the coating ratio of the carbonaceous material is 60% or more, the coating effect of the carbonaceous material can be sufficiently obtained.

The amount of carbon included in the carbonaceous coated electrode active material is preferably 0.5% by mass or more and 4.0% by mass or less, more preferably 0.8% by mass or more and 3.5% by mass or less, and still more preferably 0.9% by mass or more and 1.5% by mass or less.

When the amount of carbon is 0.5% by mass or more, it is possible to ensure conductivity suitable for cathode materials, the discharge capacity at a high charge-discharge rate increases in a case in which lithium-ion secondary batteries are formed, and it is possible to realize sufficient charge and discharge rate performance. On the other hand, when the amount of carbon is 4.0% by mass or less, the amount of carbon becomes too great, and it is possible to suppress the battery capacity of lithium-ion secondary batteries per unit mass of the cathode material for a lithium-ion secondary battery decreasing more than necessary.

The cumulative micropore volume of the cathode material measured, using a mercury porosimeter in a micropore diameter range of 0.01 to 10 µm, is preferably 0.3 to 0.5 $cm^3/g$ and more preferably 0.35 to 0.45 $cm^3/g$. When the cumulative micropore volume is 0.3 $cm^3/g$ or more, it is possible to intrude the minimum necessary amount of the electrolytic solution necessary for high input and output batteries into the agglomerated secondary particles, and thus the ion diffusivity can be guaranteed, and, when the cumulative micropore volume is 0.5 $cm^3/g$ or less, it is possible to increase the electrode density to a certain extent and guarantee discharge capacities.

Meanwhile, the cumulative micropore volume can be measured using a method described in examples.

The specific surface area of the cathode material is preferably 8 $m^2/g$ or more and 25 $m^2/g$ or less and more preferably 9 $m^2/g$ or more and 20 $m^2/g$ or less. When the specific surface area is 8 $m^2/g$ or more, in a case in which high input and output characteristics are required, the minimum necessary reaction area can be ensured, and thus it is possible to suppress an increase in the interface resistance as the electrode active material, and, when the specific surface area is 25 $m^2/g$ or less, it is possible to suppress an increase in the viscosity of electrode paste.

Meanwhile, the specific surface areas can be measured using a specific surface area meter (for example, manufactured by MicrotracBEL Corp., trade name: BELSORP-mini) and the BET method.

The oil absorption amount of the cathode material, for which N-methyl-2-pyrrolidone (NMP) is used, is preferably 30 ml/100 g or less, more preferably 35 ml/100 g or less, and still more preferably 40 ml/100 g or less and is preferably 50 ml/100 g or less. When the NMP oil absorption amount is 30 ml/100 g or more, the intrusion of the electrolytic solution into the agglomerated secondary particles is facilitated, and the ion diffusivity can be guaranteed, and, when the NMP oil absorption amount is 50 ml/100 g or less, it is difficult to intrude the binding agent or the solvent into the agglomerated secondary particles during the preparation of the cathode material paste for a lithium-ion secondary battery by mixing the cathode material, the conductive auxiliary agent, the binder resin (binding agent), and the solvent, an increase in the paste viscosity is suppressed, and it is possible to improve the properties of being applied onto the aluminum current collector. In addition, a necessary amount of the binding agent is obtained, and it is possible to improve the binding properties between the cathode mixture layer and the aluminum current collector.

Meanwhile, the NMP oil absorption amount can be measured using a method described in the examples.

In the cathode material for a lithium-ion secondary battery of the present embodiment, in a case in which the cathode mixture layer including the cathode material, the conductive auxiliary agent, and the binding agent in a weight ratio (the cathode material:the conductive auxiliary agent:the binding agent) of 90:5:5 is calendered on the 30 µm-thick aluminum current collector at a total applied pressure of 5 t/250 mm, it is possible to set the electrode density of the cathode mixture layer after the calendering to preferably 1.4 $g/cm^3$ or more and more preferably 1.5 $g/cm^3$ or more.

Method for Manufacturing Cathode Material

A method for manufacturing a cathode material of the present embodiment has, for example, a manufacturing step of an electrode active material and an electrode active material precursor, a slurry preparation step of preparing a slurry by mixing at least one electrode active material raw material selected from the group consisting of the electrode active material and the electrode active material precursor and water, a granulation step of obtaining a granulated substance by adding an organic compound that is a carbonaceous film precursor and a basic compound to the slurry obtained in the above-described step, and a calcination step of calcinating the granulated substance obtained in the above-described step in a non-oxidative atmosphere.

Manufacturing Step of Electrode Active Material and Electrode Active Material Precursor The manufacturing step of an electrode active material and an electrode active material precursor is not particularly limited, and, for example, in a case in which the electrode active material and the electrode active material precursor are represented by General Formula (1), it is possible to use a method of the related art such as a solid phase method, a liquid phase method, or a gas phase method. Examples of $Li_xA_yD_zPO_4$ obtained using the above-described method include particulate $Li_xA_yD_zPO_4$ (hereinafter, in some cases, referred to as "$Li_xA_yM_zPO_4$ particles").

The $Li_xA_yD_zPO_4$ particles can be obtained by, for example, hydrothermally synthesizing a slurry-form mixture obtained by mixing a Li source, an A source, a P source, water, and, as necessary, a D source. By means of the hydrothermal synthesis, $Li_xA_yD_zPO_4$ is generated as a precipitate in water. The obtained precipitate may be a precursor of $Li_xA_yD_zPO_4$. In this case, target $Li_xA_yD_zPO_4$ particles are obtained by calcinating the precursor of $Li_xA_yD_zPO_4$.

In this hydrothermal synthesis, a pressure-resistant airtight container is preferably used.

Here, examples of the Li source include lithium salts such as lithium acetate ($LiCH_3COO$) and lithiumchloride (LiCl), lithium hydroxide (LiOH), and the like. Among these, as the Li source, at least one selected from the group consisting of lithium acetate, lithium chloride, and lithium hydroxide is preferably used.

Examples of the A source include chlorides, carboxylates, hydrosulfates, and the like which include at least one element selected from the group consisting of Co, Mn, Ni, Fe, Cu, and Cr. For example, in a case in which A in $Li_xA_yD_zPO_4$ is Fe, examples of the Fe source include divalent iron salts such as iron (II) chloride ($FeCl_2$), iron (II) acetate ($Fe(CH_3COO)_2$), and iron (II) sulfate ($FeSO_4$). Among these, as the Fe source, at least one selected from the group consisting of iron (II) chloride, iron (II) acetate, and iron (II) sulfate is preferably used.

Examples of the D source include chlorides, carboxylates, hydrosulfates, and the like which include at least one element selected from the group consisting of Mg, Ca, Co, Sr, Ba, Ti, Zn, B, Al, Ga, In, Si, Ge, Sc, and Y.

Examples of the P source include phosphoric acid compounds such as phosphoric acid ($H_3PO_4$), ammonium dihydrogen phosphate ($NH_4H_2PO_4$), diammonium phosphate (($NH_4)_2HPO_4$), and the like. Among these, as the P source, at least one selected from the group consisting of orthophosphonic acid, ammonium dihydrogen phosphate, and diammonium phosphate is preferably used.

Slurry Preparation Step

In the present step, an electrode active material raw material obtained in the above-described step is dispersed in water, thereby preparing a homogeneous slurry. In the dispersion of the electrode active material raw material in water, it is also possible to add a dispersant thereto. As the method for dispersing the electrode active material raw material in water, for example, methods in which a medium stirring-type dispersion device that stirs medium particles at a high rate such as a planetary ball mill, an oscillation ball mill, a bead mill, a sand mill, a paint shaker, or an attritor is used are preferred.

During the preparation of the slurry, the ratio (D90/D10) of the particle diameter (D90) at a cumulative percentage of 90% to the particle diameter (D10) at 10% in the cumulative particle size distribution of the electrode active material raw material in the slurry is preferably controlled to reach 1 or more and 30 or less. When (D90/D10) is set in the above-described range, the particle size distribution of the electrode active material raw material in the slurry becomes broad, the close filling of the agglomerated secondary particles becomes easy, and it is possible to increase the density to a certain extent. D90 and D10 can be measured using, for example, a laser diffraction particle size distribution measurement instrument.

Meanwhile, the dispersion conditions of the slurry can be adjusted using, for example, the concentration, stirring rate, stirring time, and the like of the electrode active material raw material in the slurry.

Granulation Step

In the present step, first, an organic compound that is a carbonaceous film precursor is added to the slurry obtained in the above-described step, thereby obtaining a mixture.

The organic compound is not particularly limited as long as the organic compound is capable of forming the carbonaceous film on the surface of the electrode active material, and examples thereof include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols, trivalent alcohols, and the like. These organic compounds of the same kind may be used singly or a mixture of two or more kinds of organic compounds may be used.

Regarding the blending ratio between the organic compound and the electrode active material raw material, the mass of carbon obtained from the organic compound is preferably 0.5 parts by mass or more and 2.5 parts by mass or less with respect to 100 parts by mass of an active material that is obtained from the electrode active material raw material. The actual blending amount varies depending on the carbonization amount (the kind of carbon sources or carbonization conditions) by means of heating and carbonization, but is approximately 0.7 parts by mass to 6 parts by mass.

In addition, a granulated substance is prepared so that the concentration of the electrode active material raw material in the slurry preferably reaches 15% to 55% by mass and more preferably reaches 20% to 50% by mass, whereby it is possible to obtain spherical agglomerated secondary particles.

Next, the above-obtained mixture is sprayed and dried in a high-temperature atmosphere in which the atmosphere temperature is the boiling point of the solvent or higher, for example, in the atmosphere at 100° C. to 250° C., thereby obtaining a granulated substance.

During the spraying and drying, a basic compound is added to the mixture. When the basic compound is added, the pH of the slurry increases, and thus the viscosity of the slurry can be decreased, and it becomes easy to obtain agglomerated secondary particles having an arithmetic average roughness Ra of 3 nm or more and less than 15 nm.

The pH of the slurry is preferably 7.7 to 8.5, and, when the pH is set in the above-described range, it is possible to set the viscosity of the slurry to preferably 5 to 50 mPa·s, more preferably 6 to 30 mPa·s, and still more preferably 6 to 15 mPa·s.

Furthermore, it is considered that it is optimal to select a Li compound as the basic compound being used and add a small amount of the compound since impurities having an adverse influence on battery characteristics do not remain after calcination.

Examples of the basic compound include lithium hydroxide (LiOH), lithium carbonate ($Li_2CO_3$), and the like, and these compounds can be preferably used.

The blending amount of the basic compound is preferably 0.1% to 3.0% by mass and more preferably 0.3% to 2.0% by mass of the electrode active material raw material in terms of the solid content. When the blending amount is set to 0.1% by mass or more, the viscosity of the slurry is decreased to a certain extent, the fluidity of the primary particles in liquid droplets during the spraying and drying improves, and the orientation becomes favorable. When the blending amount is set to 3.0% by mass or less, the oxidation of the electrode active material is suppressed, and it is possible to ensure the charge and discharge capacity.

Here, when the conditions during the spraying, for example, the concentration of the electrode active material raw material in the slurry, the spraying pressure, and the rate, and furthermore, the conditions during the drying after the spraying, for example, the temperature-increase rate, the peak holding temperature, and the holding time are appropriately adjusted, it is possible to obtain dried substances having an arithmetic average roughness Ra of the agglomerated secondary particles described above in the above-described range.

The atmosphere temperature during the spraying and drying has an influence on the evaporation rate of the solvent in the slurry, and thus it is possible to control the structures of dried substances to be obtained.

For example, as the atmosphere temperature increases more than the boiling point of the solvent in the slurry, the drying time of sprayed liquid droplets shortens, and thus it becomes impossible to sufficiently shrink dried substances to be obtained. Therefore, dried substances are likely to have a porous structure or a hollow structure.

Calcination Step

In the present step, the granulated substance obtained in the above-described step is calcinated in a non-oxidative atmosphere.

The granulated substance is preferably calcinated in a non-oxidative atmosphere at a temperature of preferably 650° C. or higher and 1,000° C. or lower and more preferably 700° C. or higher and 900° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the mixture, a reducing atmosphere including approximately several percentages by volume of a reducing gas such as hydrogen ($H_2$) is preferred. In addition, for the purpose of removing organic components evaporated in the non-oxidative atmosphere during calcination, a susceptible or burnable gas such as oxygen ($O_2$) may be introduced into the non-oxidative atmosphere.

Here, when the calcination temperature is set to 650° C. or higher, it is easy for the organic compound in the mixture to be sufficiently decomposed and reacted, and the organic compound is easily and sufficiently carbonized. As a result, it is easy to prevent the generation of high-resistance decomposed substances of the organic compound in the obtained particles. Meanwhile, when the calcination temperature is set to 1,000° C. or lower, lithium (Li) in the electrode active material raw material is not easily evaporated, and the grain growth of the electrode active material to a size that is equal to or larger than the target size is suppressed. As a result, in a case in which lithium-ion secondary batteries including a cathode including the cathode material of the present embodiment are produced, it is possible to prevent the discharge capacity at a high charge-discharge rate from decreasing and realize lithium-ion secondary batteries having sufficient charge and discharge rate performance.

Lithium-Ion Secondary Battery

A lithium-ion secondary battery of the present embodiment is a lithium-ion secondary battery having a cathode, an anode, and an electrolyte, in which the cathode has a cathode mixture layer produced using the above-described cathode material, and the electrode density of the cathode mixture layer after the calendering is 1.4 $g/cm^3$ or more.

When the electrode density of the cathode mixture layer after the calendering is less than 1.4 $g/cm^3$, the binding force of electrode films becomes insufficient, and the electron conductivity is impaired. From such a viewpoint, the electrode density of the cathode mixture layer after the calendering is preferably 1.5 $g/cm^3$ or more.

Meanwhile, the electrode density can be measured using a method described in examples.

Cathode

In order to produce the cathode, the cathode material, a binding agent made of a binder resin, and a solvent are mixed together, thereby preparing a coating material for forming the cathode or paste for forming the cathode. At this time, a conductive auxiliary agent such as carbon black, acetylene black, graphite, Ketjen black, natural graphite, or artificial graphite may be added thereto as necessary.

As the binding agent, that is, the binder resin, for example, a polytetrafluoroethylene (PTFE) resin, a polyvinylidene fluoride (PVdF) resin, fluorine rubber, or the like is preferably used.

The blending ratio between the cathode material and the binder resin is not particularly limited; however, for example, the amount of the binder resin is set to 1 part by mass to 30 parts by mass and preferably set to 3 parts by mass to 20 parts by mass with respect to 100 parts by mass of the cathode material.

The solvent that is used in the coating material for forming the cathode or the paste for forming the cathode may be appropriately selected depending on the properties of the binder resin.

Examples thereof include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetylacetone, and cyclohexanone; amides such as dimethyl formamide, N,N-dimethylacetoacetamide, and N-methyl-pyrrolidone; glycols such as ethylene glycol, diethylene glycol, and propylene glycol, and the like. These solvents of the same kind may be used singly, or a mixture of two or more kinds of solvents may be used.

Next, the coating material for forming the cathode or the paste for forming the cathode is applied onto one surface of an aluminum foil and then dried, thereby obtaining an aluminum foil having a coated film made of the mixture of the cathode material and the binder resin formed on one surface.

Next, the coated film is pressed by pressure and dried, thereby producing a current collector (cathode) having a cathode material layer on one surface of the aluminum foil.

In the above-described manner, it is possible to produce the cathode in which the discharge capacity can be increased by decreasing the direct current resistance.

Anode

Examples of the anode include anodes including carbon materials such as metallic Li, natural graphite, and hard carbon and anode materials such as a Li alloy, $Li_4Ti_5O_{12}$, and $Si(Li_{4.4}Si)$.

Electrolyte

The electrolyte is not particularly limited, but is preferably a non-aqueous electrolyte, and examples thereof include electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

Separator

The cathode in the present embodiment and the anode in the present embodiment can be made to face each other through a separator. As the separator, it is possible to use, for example, porous propylene.

In addition, instead of the non-aqueous electrolyte and the separator, a solid electrolyte may be used.

In the lithium-ion secondary battery of the present embodiment, the cathode has the cathode mixture layer formed using the cathode material for a lithium-ion secondary battery of the present embodiment, and thus it is possible to decrease the direct current resistance, and the lithium-ion secondary battery can be preferably used in high-output applications such as vehicles.

Meanwhile, the "direct current resistance (DCR)" in the present invention refers to an evaluation value of a resistance generated when a battery is instantly charged and discharged with a large current. Batteries for ESS application are used at a relatively low current rate of approximately 2 to 3 C and thus have required performance that is different from that of batteries for vehicle application.

EXAMPLES

Hereinafter, the present invention will be specifically described using examples and comparative examples. Meanwhile, the present invention is not limited to forms described in the examples.

Synthesis of Cathode Material for Lithium-Ion Secondary Battery

Example 1

Lithium phosphate ($Li_3PO_4$) as a Li source and a P source and iron (II) sulfate ($FeSO_4$) as an Fe source were mixed together so that the molar ratio (Li:Fe:P) reached 3:1:1. Furthermore, distilled water for preparation was mixed thereinto, thereby preparing a raw material slurry (600 ml).

Next, this raw material slurry was stored in a pressure-resistant airtight container, was hydrothermally synthesized at 180° C. for two hours, and was cooled to room temperature (25° C.), thereby obtaining cake-form electrode active material particles which were precipitated in the container. The electrode active material particles were sufficiently cleaned a plurality of times with distilled water, and then the electrode active material particles and distilled water were mixed together so that the concentration of the electrode active material particles reached 60% by mass, thereby preparing a suspended slurry.

The suspended slurry was injected into a sand mill together with zirconia balls having a diameter of 0.1 mm, and a dispersion treatment was carried out with the treatment time of the sand mill adjusted so that the ratio (D90/D10) of the particle diameter (D90) at a cumulative percentage of 90% from the small particle size side to the particle diameter (D10) at a cumulative percentage of 10% in the volume cumulative particle size distribution of the electrode active material particles in the suspended slurry reached two.

Next, an aqueous solution of glucose which had been adjusted to 30% by mass in advance, which amounted to 2.0% by mass of the electrode active material particles in terms of the solid content of the glucose, was mixed into the slurry on which the dispersion treatment had been carried out, and furthermore, distilled water was mixed therewith so that the concentration of the electrode active material particles in the slurry reached 50% by mass. An aqueous solution of lithium hydroxide (LiOH) which had been adjusted to 30% by mass in advance, which amounted to 0.1% by mass of the electrode active material particles in terms of the solid content of LiOH, was mixed into the obtained mixture, thereby adjusting the pH of the slurry to 7.7. Therefore, the viscosity of the slurry reached 12 mPa·s, and furthermore, the slurry was sprayed and dried in the atmosphere at 180° C., thereby obtaining a granulated dried substance of the electrode active material particles.

Next, the obtained dried substance was thermally treated at 750° C. in an inert atmosphere for one hour so as to support carbon in the electrode active material particles, thereby producing a cathode material for a lithium-ion secondary battery of Example 1.

Example 2

A cathode material for a lithium-ion secondary battery of Example 2 was produced in the same manner as in Example 1 except for the fact that an aqueous solution of LiOH which had been adjusted to 30% by mass in advance, which amounted to 0.2% by mass of the electrode active material particles in terms of the solid content of LiOH, was mixed into a mixture obtained in the same manner as in Example 1, thereby setting the pH of the slurry to 7.9 and thus setting the viscosity of the slurry to 10 mPa·s.

Example 3

A cathode material for a lithium-ion secondary battery of Example 3 was produced in the same manner as in Example 1 except for the fact that an aqueous solution of LiOH which had been adjusted to 30% by mass in advance, which amounted to 0.4% by mass of the electrode active material particles in terms of the solid content of LiOH, was mixed into a mixture obtained in the same manner as in Example 1, thereby setting the pH of the slurry to 8.5 and thus setting the viscosity of the slurry to 8 mPa·s.

Comparative Example 1

A cathode material for a lithium-ion secondary battery of Comparative Example 1 was produced in the same manner as in Example 1 except for the fact that an aqueous solution of citric acid which had been adjusted to 30% by mass in advance, which amounted to 2.5% by mass of the electrode active material particles in terms of the solid content of the citric acid, was mixed into a mixture obtained in the same manner as in Example 1, thereby setting the pH of the slurry to 7.0 and thus setting the viscosity of the slurry to 60 mPa·s.

Comparative Example 2

A cathode material for a lithium-ion secondary battery of Comparative Example 2 was produced in the same manner as in Example 1 except for the fact that an aqueous solution of citric acid which had been adjusted to 30% by mass in advance, which amounted to 3.0% by mass of the electrode active material particles in terms of the solid content of the citric acid, was mixed into a mixture obtained in the same manner as in Example 1, thereby setting the pH of the slurry to 6.6 and thus setting the viscosity of the slurry to 85 mPa·s.

Comparative Example 3

A cathode material for a lithium-ion secondary battery of Comparative Example 3 was produced in the same manner as in Example 1 except for the fact that an aqueous solution of citric acid which had been adjusted to 30% by mass in advance, which amounted to 3.5% by mass of the electrode active material particles in terms of the solid content of the citric acid, was mixed into a mixture obtained in the same manner as in Example 1, thereby setting the pH of the slurry to 5.8 and thus setting the viscosity of the slurry to 120 mPa·s.

Comparative Example 4

A cathode material for a lithium-ion secondary battery of Comparative Example 4 was produced in the same manner as in Example 1 except for the fact that an aqueous solution of citric acid which had been adjusted to 30% by mass in advance, which amounted to 4.0% by mass of the electrode active material particles in terms of the solid content of the citric acid, was mixed into a mixture obtained in the same manner as in Example 1, thereby setting the pH of the slurry to 5.0 and thus setting the viscosity of the slurry to 165 mPa·s.

Comparative Example 5

A cathode material for a lithium-ion secondary battery of Comparative Example 5 was produced in the same manner as in Example 1 except for the fact that an aqueous solution of LiOH which had been adjusted to 30% by mass in advance, which amounted to 0.01% by mass of the electrode active material particles in terms of the solid content of LiOH, was mixed into a mixture obtained in the same manner as in Example 1, thereby setting the pH of the slurry to 7.6 and thus setting the viscosity of the slurry to 50 mPa·s.

Evaluation of Cathode Materials

The obtained cathode materials were evaluated using the following methods. The results are shown in Table 1.

1. Arithmetic Average Roughness Ra of Agglomerated Secondary Particle Surface

The above-described cathode material was fixed onto carbon tape, and one agglomerated secondary particle was observed using SEM under the following conditions. The arithmetic average roughness Ra of the agglomerated secondary particle surface was computed by respectively measuring the roughness values in a 2 μm range in x and y directions from the center of the agglomerated secondary particle surface and averaging the roughness values. Meanwhile, the definition of the roughness parameter Ra is based on JIS B 0601 (2001).

Measurement Conditions

Measurement instrument: Three-dimensional scanning electron microscope, manufactured by Elionic Inc., trade name: ERA-8800FE Accelerated voltage: 5 KV Specimen adjustment: No deposition treatment 2. Cumulative Micropore Volume The cumulative micropore volume was measured using a mercury porosimeter (manufactured by Quantachrome Instruments Japan G. K., POREMASTER).

3. Specific Surface Area

The specific surface areas of the cathode materials were measured using a specific surface area meter (manufactured by MicrotracBEL Corp., trade name: BELSORP-mini) and a BET method in which nitrogen ($N_2$) adsorption was used.

4. Oil Absorption Amount for which N-Methyl-2-Pyrrolidinone (NMP) was Used (NMP Oil Absorption Amount)

The oil absorption amount for which N-methyl-2-pyrrolidinone (NMP) was used was measured using a method according to JIS K5101-13-1 (refined linseed oil method) and linseed oil instead of NMP.

5. Amount of Carbon

The amount of carbon was measured using a carbon analyzer (manufactured by Horiba Ltd., Model No. EMIA-920V).

Production of Cathodes

The obtained cathode material, polyvinylidene fluoride (PVdF) as a binder, and acetylene black (AB) as a conductive auxiliary agent were mixed together so that the mass ratio therebetween reached 90:5:5, and furthermore, N-methyl-2-pyrrolidinone (NMP) was added thereto as a solvent so as to impart fluidity, thereby producing a slurry.

Next, this slurry was applied and dried on a 30 μm-thick aluminum (Al) foil (current collector). After that, the product was pressed using a roll press at a total applied pressure of 5 t/250 mm (5 tons of roll pressure applied across 250 mm), thereby producing a cathode for each of the examples and the comparative examples.

Evaluation of Cathodes

The obtained cathodes were evaluated using the following methods. The results are shown in Table 1.

6. Electrode Density after Calendering

The cathode pressed at a total applied pressure of 5 t/250 mm was punched into ϕ15.9 mm using a coin-type clicking machine.

The thickness of the punched-out cathode was measured at five points, a value obtained by subtracting the thickness of the current collector from the average value thereof was considered as the thickness of the cathode, and the cathode volume was computed. Similarly, the mass of the cathode was computed from the difference in mass between the electrode and the current collector and was divided by the cathode volume, thereby obtaining an electrode density after calendering.

Production of Lithium-Ion Secondary Batteries

Lithium metal was disposed as an anode with respect to the above-obtained cathode for a lithium-ion secondary battery, and a separator made of porous polypropylene was disposed between the cathode and the anode, thereby producing a member for a battery.

Meanwhile, ethylene carbonate and diethyl carbonate were mixed together in a mass volume of 1:1, and furthermore, 1 M of a $LiPF_6$ solution was added thereto, thereby producing an electrolyte solution having lithium ion conductivity.

Next, the member for a battery was immersed in the electrolyte solution, thereby producing a lithium-ion secondary battery of each of examples and comparative examples.

Evaluation of Lithium-Ion Secondary Batteries

The obtained lithium-ion secondary batteries were evaluated using the following methods. The results are shown in Table 1.

7. Discharging Direct Current Resistance (DCR)

The direct current resistance was measured using a lithium-ion secondary battery in which the depth of charge was adjusted to 50% (SOC 50%) with a constant current at an ambient temperature of 0° C. and a charge rate of 0.1 C. In the lithium-ion secondary battery adjusted to SOC 50% at room temperature (25° C.), currents were made to flow on the discharge side at rates of 1C, 3C, 5C, and 10C for ten seconds each, the current density (the value standardized by dividing the current value by the weight of the active material) and the voltage value after 10 seconds at the respective rates were plotted in the horizontal axis and the vertical axis respectively, and the slopes of the approximate value line obtained using the least square method were considered as "discharge side=output DCR". Meanwhile, at the respective currents, a 10-minute quiescent time was provided whenever the current flow direction or the flowing current was changed.

TABLE 1

| | Average roughness Ra of agglomerated secondary particle surfaces [nm] | Cumulative micropore volume [cm³/g] | Specific surface area [m²/g] | NMP oil absorption amount [mL/100 g] | Amount of carbon [% by mass] | Electrode density [g/cm³] | Discharge DCR [Ω · mg] |
|---|---|---|---|---|---|---|---|
| Example 1 | 12.2 | 0.37 | 9.8 | 40 | 1.03 | 1.62 | 156 |
| Example 2 | 7.6 | 0.42 | 9.7 | 35 | 1.00 | 1.69 | 150 |
| Example 3 | 4.5 | 0.38 | 9.8 | 50 | 0.98 | 1.71 | 149 |
| Comparative Example 1 | 15.7 | 0.55 | 10.2 | 53 | 1.20 | 1.57 | 166 |
| Comparative Example 2 | 20.7 | 0.55 | 11.1 | 54 | 1.31 | 1.55 | 172 |
| Comparative Example 3 | 22.1 | 0.55 | 13.3 | 55 | 1.41 | 1.48 | 177 |
| Comparative Example 4 | 24.6 | 0.61 | 14.5 | 65 | 1.55 | 1.48 | 187 |
| Comparative Example 5 | 15.5 | 0.55 | 10.6 | 50 | 1.22 | 1.55 | 167 |

When Examples 1 to 3 and Comparative Examples 1 to 5 are compared with each other from the results in Table 1, it could be confirmed that, in the cathodes for a lithium-ion secondary battery of Examples 1 to 3, the arithmetic average roughness Ra of the surfaces of the agglomerated secondary particles was as small as 4.5 to 12.2 nm, and, in the cathodes for a lithium-ion secondary battery of Examples 1 to 3, the discharge DCR was low.

What is claimed is:

1. A cathode material for a lithium-ion secondary battery which is made of agglomerated secondary particles formed by agglomeration of a plurality of primary of electrode active material particles made of a transition metal lithium phosphate compound having an olivine structure that is coated with a carbonaceous material, wherein an arithmetic average roughness Ra of agglomerated secondary particle surfaces observed using a three-dimensional scanning electron microscope is 3 nm or more and less than 15 nm.

2. The cathode material for a lithium-ion secondary battery according to claim 1,
wherein a cumulative micropore volume of the cathode material, measured using a mercury porosimeter in a micropore diameter range of 0.01 to 10 μm, is 0.3 to 0.5 cm³/g.

3. The cathode material for a lithium-ion secondary battery according to claim 1,
wherein a specific surface area of the cathode material is 8 m²/g or more and 25 m²/g or less, and an oil absorption amount of the cathode material, measured using N-methyl-2-pyrrolidone, is 30 ml/100 g or more and 50 ml/100 g or less.

4. The cathode material for a lithium-ion secondary battery according to claim 1,
wherein, in a case in which a cathode mixture layer including the cathode material, a conductive auxiliary agent, and a binding agent in a weight ratio of 90:5:5 (the cathode material:the conductive auxiliary agent: the binding agent) is calendered on a 30 μm-thick aluminum current collector at a total applied pressure of 5 t/250 mm, an electrode density of cathode mixture layer after the calendering is 1.4 g/cm³ or more.

5. A lithium-ion secondary battery comprising:
a cathode;
an anode; and
an electrolyte,
wherein the cathode has a cathode mixture layer produced using the cathode material according to claim 1, and an electrode density of the cathode mixture layer after calendering is 1.4 g/cm³ or more.

6. The lithium-ion secondary battery according to claim 5,
wherein the cathode mixture layer includes a cathode material made of agglomerated secondary particles formed by agglomeration of a plurality of primary particles of electrode active material particles represented by General Formula (1) that are coated with a carbonaceous material, $$Li_xA_yD_zPO_4 \qquad (1)$$

(here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).